(12) United States Patent
Sharma et al.

(10) Patent No.: US 8,595,074 B2
(45) Date of Patent: Nov. 26, 2013

(54) SYSTEM AND METHOD FOR ACTIVATING OR CHANGING THE STATUS OF AN ACCOUNT ASSOCIATED WITH A PREPAID CARD

(75) Inventors: Bansi L. Sharma, Morristown, NJ (US); Michael L. Peterson, South Jordan, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 1417 days.

(21) Appl. No.: 10/891,198

(22) Filed: Jul. 14, 2004

(65) Prior Publication Data

US 2005/0027655 A1 Feb. 3, 2005

Related U.S. Application Data

(60) Provisional application No. 60/487,627, filed on Jul. 15, 2003.

(51) Int. Cl.
*G06G 1/12* (2006.01)
*G06Q 20/00* (2012.01)
*G06Q 40/00* (2012.01)
*G06K 5/00* (2006.01)

(52) U.S. Cl.
USPC ............... 705/21; 705/41; 705/16; 235/380

(58) Field of Classification Search
USPC ................................ 705/16–18, 44
See application file for complete search history.

(56) References Cited

U.S. PATENT DOCUMENTS

| | | | |
|---|---|---|---|
| 5,644,118 | A | 7/1997 | Hayashida |
| 6,000,608 | A * | 12/1999 | Dorf ............................. 235/380 |
| 6,032,136 | A | 2/2000 | Brake, Jr. et al. |
| 6,185,545 | B1 | 2/2001 | Resnick et al. |
| 6,374,230 | B1 | 4/2002 | Walker et al. |
| 6,374,231 | B1 | 4/2002 | Bent et al. |
| 6,405,182 | B1 | 6/2002 | Cuervo |
| 6,473,500 | B1 * | 10/2002 | Risafi et al. .............. 379/144.01 |

(Continued)

FOREIGN PATENT DOCUMENTS

| | | | | |
|---|---|---|---|---|
| WO | WO 00/50986 | * | 8/2000 | ............... G06F 7/12 |
| WO | 0109853 | | 2/2001 | |
| WO | 0131555 | | 5/2001 | |
| WO | 0159587 | | 8/2001 | |

OTHER PUBLICATIONS

International Standard ISO 8583-1, Financial transaction card originated messages-interchange message specification, First edition Jun. 15, 2003, pp. 1-203.*

(Continued)

*Primary Examiner* — Fahd Obeid
(74) *Attorney, Agent, or Firm* — Snell & Wilmer L.L.P.

(57) ABSTRACT

A system and method for activating and funding prepaid cards at the point of sale by making innovative use of existing point-of-sale devices and existing credit/debit card acceptance networks and processes. The invention obviates the need to implement new/different technology at point-of-sale terminals that are widely used at retail outlets. This invention makes use of the existing credit and charge card systems and processes, including industry standard message formats, to settle funds and fees between the seller and the issuer of the prepaid card, thus further reducing the expense and time-to-market for product distribution.

13 Claims, 2 Drawing Sheets

(56) References Cited

U.S. PATENT DOCUMENTS

| | | |
|---|---|---|
| 2001/0032878 A1 | 10/2001 | Tsiounis et al. |
| 2001/0034722 A1 | 10/2001 | Tidball et al. |
| 2002/0152124 A1 | 10/2002 | Guzman et al. |
| 2003/0026404 A1 | 2/2003 | Joyce et al. |
| 2004/0083184 A1* | 4/2004 | Tsuei et al. .................... 705/74 |

OTHER PUBLICATIONS

Lamond, Keith; "Credit Card Transactions Real World and Online," *Paying by Credit Card*. Internet article 1996; p. 1-18.

ISO 8583-1 "Financial Transaction Card Originated Messages—Interchange Message Specifications Part 1," p. 1-204; 2003 Switzerland.

ISO 8583-1 "Financial Transaction Card Originated Messages—Interchange Message Specifications Part 2," p. 1-12; 2003 Switzerland.

ISO 8583-1 "Financial Transaction Card Originated Messages—Interchange Message Specifications Part 3," p. 1-16; 2003 Switzerland.

Search Report for PCT/US04/22639 (Dec. 13, 2004).

Written Opinion of the International Searching Authority (Mar. 10, 2005).

PCT; International Preliminary Report on Patentability dated May 25, 2005 in Application No. PCT/US2004/022639.

EP; Supplemental Search Report dated Mar. 11, 2008 in EP Application No. 04778244.6.

\* cited by examiner

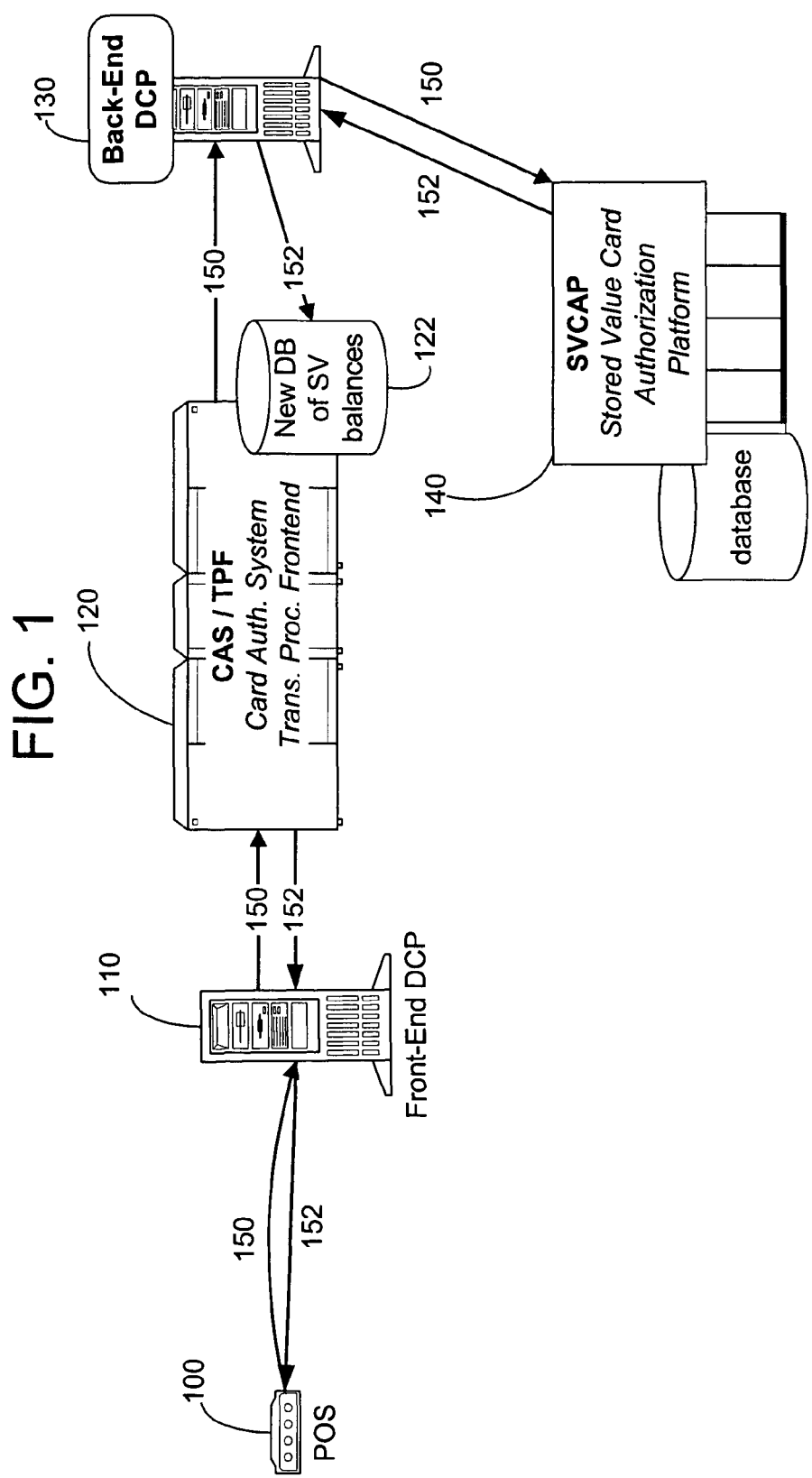

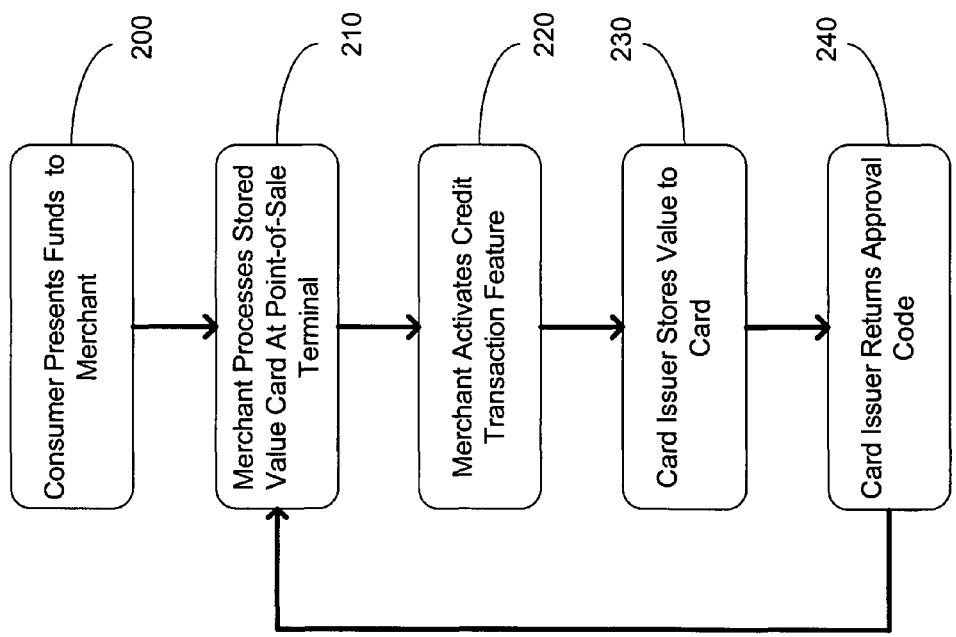

SYSTEM AND METHOD FOR ACTIVATING OR CHANGING THE STATUS OF AN ACCOUNT ASSOCIATED WITH A PREPAID CARD

CROSS-REFERENCE TO RELATED PATENT APPLICATIONS

This patent application claims the benefit of U.S. Patent Application No. 60/487,627, filed Jul. 15, 2003.

FIELD OF THE INVENTION

The present invention relates generally to prepaid or stored value cards used for purchasing good and services, and more particularly to a system and method for activating or changing the value of an account associated with such a card without requiring additional technology to be added to existing point-of-sale terminals.

The invention permits the sale or issuance of prepaid cards by activating the card and/or loading a specific amount of funds or points on the account associated with the card at any outlet where credit or debit cards are accepted as forms of payment or identification, or at any outlet where a device with the capability to authorize or capture a credit/debit card transaction can be installed.

BACKGROUND OF THE INVENTION

Stored value cards, such as pre-paid gift cards and the like, are well known in the art. Such cards are typically associated with an account maintained at a financial institution that issued the card. It will be appreciated by persons of skill in the art that the term "card" as used herein does not refer to any specific form factor. Rather a "card" may be any physical or virtual device that can be linked to an account. For example, the term "card" as used herein should be understood to mean a traditional card, such as a CR80, or any number of other formfactors such as contactless fobs and the like.

Prior to using the card for purchasing goods and services from a seller or merchant, a stored value card user typically deposits, or "stores," a sum of money into the account associated with the card. Once the card is used to purchase goods and services, the cost of those goods and services is debited from the account. If the cost of the purchase exceeds the monetary sum stored in the account, the debit transaction usually cannot not proceed until more funds are added to the account. Accordingly, stored value cards are distinguishable from charge/credit cards in which the financial institution extends credit by paying the merchant or seller and then later seeks reimbursement from the card holder.

Activation and tracking of the accounts associated with prepaid cards may be accomplished in several different ways. In one commonly used method, a centrally located host computer system, including one or more computer platforms, tracks all transactions involving the prepaid card. Activation of the card, as well as all debit and funding transactions, are communicated from various retail points of sale to the centrally located host computer system, which is maintained by the card-issuing financial institution. To activate the card, or to debit or credit the account associated with the card, the card issuer must first develop a network of point-of-sale devices that communicate with the card issuer's host computer systems. Processing the prepaid card through the point-of-sale terminal causes the terminal to transmit messages over the network to the host computer system, which messages inform the host computer to activate, credit or debit the prepaid account.

Prior art approaches to implementing centrally tracked prepaid cards involved hardware and/or software that was customized for the purpose of administering such cards. For example, a dedicated point-of-sale terminal for prepaid cards may be employed to generate the special messages associated with prepaid cards. In certain situations, existing point-of-sale terminals may be extended to accommodate prepaid cards without significant hardware modification, but even for such extendible terminals, extensive software modifications are required to permit the terminals to generate the special messages used by the host computer system to implement prepaid accounts. Accordingly, there is a need for an improved system and method for activating and/or changing the status of an account associated with a prepaid card without requiring dedicated hardware or software at the point-of-sale or without requiring extensive modifications to existing point-of-sale terminals.

SUMMARY OF THE INVENTION

The invention comprises a system and method for activating and changing the status of a prepaid card through the use of industry-standard messages, such as those described in ISO/IEC 8583. Most retailers use point-of-sale terminals to process debit/charge/credit card transactions, which terminals generate and receive industry standard messages based on input from the retailers.

For example, a seller may accept payment for a sale by swiping the card holder's card through the terminal's card reader, inputting to the terminal the amount of the purchase to be charged, and pressing the appropriate keys on the terminal to indicate that the transaction involves a charge against the card holder's account. The point-of-sale terminal accepts this input from the seller and generates the industry standard electronic message that is transmitted to the appropriate financial institution. The electronic message includes, for example, the number of the card, the transaction type, and the amount of the purchase. In the event of a return or credit, the seller likewise swipes the card, inputs the amount of the return or credit, and presses the appropriate keys to indicate that the transaction is to be credited to the account associated with the card. Such transactions, and the standard messages associated with such transactions, are well-known.

In the inventive system and process, industry standard messages are employed to activate and/or change the status of prepaid cards. For example, industry standard funding, credit, return, or void transactions, which are commonly implemented in most point-of-sale terminals, may be used to activate and/or load value into an account associated with a prepaid card. The "back-office" computing platforms receive these industry standard messages, detect that the messages relate to a prepaid or stored value card account, and interpret the messages in context. Through the use of industry standard messages, no hardware or software modifications are required to the point-of-sale terminals that are widely used throughout the world. Instead, only the back-office computing platforms, which are centrally located, need be modified.

BRIEF DESCRIPTION OF THE DRAWINGS

FIG. 1 is a block diagram representing the hardware and software components common to a card processing/transaction network but configured to enable a prepaid or stored value card and to carry out the inventive process.

FIG. 2 is a flow chart illustrating the steps of the inventive process.

DETAILED DESCRIPTION OF THE INVENTION

Referring now to the figures, wherein like reference numbers refer to like elements, there is illustrated in FIG. 1 the hardware and software components of an exemplary network that may be used to process prepaid card transactions as well as ordinary charge/credit transactions. The network includes one or more point-of-sale terminals 100 remotely located with sellers and merchants of goods and services. The terminals 100 are electronic devices that typically include a keypad and a visual display. To process the cards, the terminals also typically include a card reader that can read a machine-readable medium on the card, such as a magnetic strip. Other examples of reading machines and machine-readable mediums include optical and electronic storage technologies. In some embodiments, the terminal may be a special purpose device designed around the card reader, while in other embodiments the terminal may be a general purpose personal computer having a card reader attached thereto. Other implementations and embodiments are well-known to persons of skill in the art, such as the use of a key fob as a "card" input device.

The terminals 100 communicate with a front-end computing platform, identified as Distributed CAS (Card Authorization System) Platform ("DCP") 110, maintained by a card-issuing financial institution. The communication between the terminals and the front-end computing platform occurs over existing telecommunication networks via electronic, radio, and/or satellite communication links. The front-end platform, DCP 110, further is in communication with a Card Authorization System/Transaction Processing Front End platform ("CAS/TPF") 120, which is also maintained by the card-issuing financial institution. The CAS/TPF platform 120, in turn, is in communication with a back-end computing platform, such as DCP 130, that is in communication with a Stored Value Card Authorization Platform ("SVCAP") 140. The back-end DCP 130 and SVCAP 140 are also maintained by the card-issuing financial institution. Accordingly, front-end DCP 130 and CAS/TPF platform 120 are denoted as front-end components of the network while the back-end DCP 130 and SVCAP 140 are denoted as back-end components. The front-end and back-end DCPs and the platforms can be incorporated in any suitable computer system such as personal computers, servers, and mainframes.

It will be appreciated that the above described computer system is only an exemplary description of a possible "back office" or host computing system and that other configurations may be used to facilitate the present invention. Accordingly, the above described system including the front-end DCP 110, CAS/TPF 120, back-end DCP 130 and SVCAP 140 are not to be construed as limitations on the present invention. Instead, any suitable computing platform to process the relevant data messages may be employed.

Referring to FIG. 2, to activate and/or credit the prepaid card in accordance with the teachings of the invention, in a first step 200 of the process the customer who is desirous of activating or changing the status of a prepaid card will tender payment, e.g., cash, a personal check, or a credit card, to the seller or merchant. The customer may also present a preexisting card to the seller. If the customer is activating a new prepaid card, the initially inactivated card may be in the possession of the seller and turned over to the customer after activation. The "card" may have any suitable shape or form including, without limitation, a CR80 standard card size or a key fob.

The prepaid card may be issued by the financial institution (hereinafter card issuer) responsible for maintaining the computer platforms and system described with reference to FIG. 1. The card may already be associated with an account maintained by the card issuer or may require initialization of a new account with the card issuer to complete the activation of the card. Accordingly, the card user may replenish an existing account or initialize a new account. Additionally, the value added to the card may be a pre-defined amount (i.e., pre-defined value gift cards or cards ranging in value over multiple increments) or may vary according to the amount desired by the customer/card user.

In the second step 210 of the process, the seller or merchant processes the prepaid card through the point-of-sale terminal during which a card number is read from the card. The card number is associated with an account tracked by a host computer system, such as that described in connection with FIG. 1. The system uses the card number to associate a particular card with a particular account. Also entered by the seller or merchant into the point-of-sale terminal is the value of the monetary funds tendered. In the third step 220, the seller or merchant activates the credit transaction feature, which may be accomplished, for example, by depressing a button denoted "Credit" on the keypad.

The operations performed by the point-of-sale terminal are well-known and apply to the debit/charge/credit card transactions for which the terminal has been programmed. The credit transaction feature generates a credit message to be sent from the point-of-sale terminal 100 to the host computer systems. The credit message is typically in an industry standard format, such as a funding, credit, void, or return format as well as other formats such as those defined by ISO/IEC 8583. The credit message also includes information identifying the card number and the amount of the funds that were tendered. In the embodiment of FIG. 1, the front-end DCP 110 receives the message from the point-of-sale terminal and sends the credit message to the CAS/TPF platform 120. The CAS/TPF 120 may also send the data message onto the back-end DCP 130 and the SVCAP 140 for further processing. The path of the credit message through the network is denoted by the arrows referenced 150. The host computer system thereafter processes the data message received from the point-of-sale terminal.

FIG. 1 generally illustrates a real time transmission of information from the point-of-sale terminal to the host computer but it will be appreciated by persons of skill in the art that batch processing of information may also be employed. That is, the credit message may be sent from the point-of-sale terminal 100 to the front-end DCP 110 immediately, or the credit message may be delayed for batch processing. In the latter process, sellers and merchants may submit multiple debit and credit transactions to the financial institutions bundled together as a batch and transmitted to the host computer according to a predetermined frequency. Sending the credit messages via batch processing, however, may result in a delay as to when the stored funds become available.

To update the account, the software running on the host computer interprets the data message as intending to credit the value of the tendered funds to the designated account. The host computer may so interpret the data message based on information within the message itself, such as the card number, which may heuristically indicate that the account pertains to a stored value card. An account balance associated with the card is maintained in a computer database 122 that is also part of the host computer. Crediting of the account by the card issuer corresponds to step 230 of the process in FIG. 2. The card issuer settles fund transfers with the seller through a separate transaction. Settlement between the card issuer and seller may occur on a periodic, predetermined basis.

If the information contained in the credit message does not correspond to an active account presently maintained on the host computer, the software running on the host computer interprets this as an attempt to activate a new prepaid card. The host computer thereafter validates the card number, creates a new account, designates that account as corresponding to the associated prepaid card, and credits to the account the amount indicated by the credit message. The new prepaid card issued to the customer is thereby activated.

In another embodiment, to provide additional security and protection regarding issuing and activating new prepaid cards, the credit message received by the host computer may only trigger the card issuer's computer system to change the status of the new card from "inactive" to "pending active." Fully activating the card requires another trigger mechanism such as having the cardholder contact the card issuer. This also allows the card issuer to obtain more information about the card user such as their name, address, and phone number that cannot be transmitted to the card issuer through the existing point-of-sale terminal.

An advantage of the new process is that the card issuer's records of the account are updated to reflect the credit without having to modify the point-of-sale terminals and other components located with and/or owned by the sellers or merchants. Another advantage is that prepaid cards can be activated and new accounts created by using the existing point-of sale terminals. All modifications necessary to implement the new system and method are made to the components maintained by the card issuer.

In a further embodiment of the new process, as represented by step 240 of FIG. 2, the network can be used to transmit a "notification" message from the back-end components to the point-of-sale terminal. The notification message informs the card holder that the account associated with the card has been credited. In a further embodiment, the notification message may also verify the amount credited to the account.

To implement the notification message, the host computer including, for example, the CAS/TPF platform, back-end DCP, and SVCAP make use of the existing authorization code feature in the network. Specifically, when processing a charge/credit transaction, the point-of-sale terminal sends an authorization request along with the charge/credit account information to the computer platforms maintained by the financial institution. The host computer determines if the respective charge/credit account has sufficient credit to proceed with the transaction. If so, the host computer invokes the authorization code feature that transmits an authorization code back to the point-of-sale terminal authorizing the transaction.

Once the front-end and back-end components determine that the value credited has been stored in the respective account, the host computer invokes the software responsible for transmitting the authorization code to the point-of-sale terminal. The transmission of the authorization code through the network components is designated by the reference arrows 152 in FIG. 1. The seller or merchant, being aware that a credit transaction was just processed for a stored value card, is able to interpret the authorization code received by the point-of-sale terminal as the notification message. The seller or merchant will relay the notification message to the card user to verify to the card user completion of the credit transaction.

The inventive system and method may be implemented as described in the following example. It is assumed for purposes of this discussion that the seller has been provided with inactive prepaid cards packaged in a manner compatible with this solution and that a customer has entered the store and chosen to purchase a fixed amount prepaid card from the seller.

The seller prepares the transaction request as a credit transaction and swipes the prepaid card packaging through the existing point-of-sale equipment. This terminal generates an industry standard message, e.g., ISO/IEC 8583 format, and transmits the message to the host system. The host system, as illustrated generally in FIG. 1, thereafter receives the transaction request and, based on the context of the message and information stored in the computer platforms, determines special processing is required (activation). The prepaid card is activated and the value of the prepaid card is determined by the business rules in place for this product. In addition, any seller fees owed to or by the host product/system owner might be recorded at this time or deferred until the next scheduled batch process from the seller.

The host computer systems thereafter indicates a successful activation to the seller using an industry standard return message, e.g., ISO/IEC 8583 format. The seller collects the value of the prepaid card (and any other fees) from the customer, and the customer leaves the store with the activated prepaid card and relevant receipts. The customer may thereafter use the card at any location where the card issuer's financial products are accepted. It is noted that the sequence of the above steps is exemplary only and may be modified. For example, the seller may request payment before the point-of-sale terminal transmits the message to the host computer system.

All references, including publications, patent applications, and patents, cited herein are hereby incorporated by reference to the same extent as if each reference were individually and specifically indicated to be incorporated by reference and were set forth in its entirety herein. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What we claim is:

1. A method comprising:
   receiving, at a charge authorization computer, a first ISO/IEC compliant message from a point-of-service (POS) terminal, wherein the POS terminal includes POS hardware and POS software, wherein the POS hardware and the POS software have not been modified to accommodate processing transactions to at least one of activate stored value accounts or load stored value accounts, wherein stored valued accounts are associated with stored value cards, and wherein a seller is provided with a plurality of stored value cards, and a customer conducting a transaction with the seller acquires a stored value card from the seller;
   parsing, by the charge authorization computer, the first ISO/IEC 8583 compliant message to create a first parsed transaction request comprising a stored value account identifier associated with the stored value card, a first transaction amount, and a processing type code;
   determining, by the charge authorization computer, that the processing type code is associated with a request to apply a credit to a stored value account associated with the stored value account identifier;
   determining, by the charge authorization computer, that the stored value account identifier does not correspond to any stored value account identifier that is presently maintained by the charge authorization computer;
   inferring, by the charge authorization computer and in response to the determining that the stored value account identifier does not correspond to any stored value account identifier that is presently maintained by the charge authorization computer, that the request to apply the credit is a request to create a new first stored value account;
   creating, by the charge authorization computer, the new first stored value account;
   designating, by the charge authorization computer, the new first stored value account as corresponding to the stored value card;
   crediting, by the charge authorization computer, an amount to the new first stored value account;
   updating, by the charge authorization computer, the status of the stored value card from inactive to pending active;
   receiving, by the charge authorization computer and from a holder of the new first stored value account, information associated with the holder of the new first stored value account that cannot be transmitted to the charge authorization computer by way of the POS terminal; and
   activating, by the charge authorization computer, the new first stored value account in response to receiving the information associated with the holder of the new first stored value account.

2. The method of claim 1, wherein the POS terminal transmits the first ISO/IEC compliant message in response to a merchant selecting the funding, credit, return or void function of the POS terminal.

3. The method of claim 2, further comprising determining whether the first stored value account requires a second authorization step.

4. The method of claim 3 further comprising the step of maintaining an account with each merchant to track the credits and debits to a plurality of transaction accounts.

5. The method of claim 4, wherein the first ISO/IEC compliant message comprises a processing type code in the range 20-2Z, wherein the processing type code and the range are defined by ISO/IEC 8583.

6. The method of claim 5, wherein the form factor of at least one of the first stored value card and second stored value card follows the CR80 standard.

7. The method of claim 6, wherein the form factor of at least one of the first stored value card and second stored value card is a key fob.

8. A system comprising:
   a processor for authorizing a charge,
   a tangible, non-transitory memory configured to communicate with the processor,
   the tangible, non-transitory memory having instructions stored thereon that, in response to execution by the processor, cause the processor to perform operations comprising:
   receiving, by the processor, a first ISO/IEC compliant message from a point-of-service (POS) terminal, wherein the POS terminal includes POS hardware and POS software, wherein the POS hardware and the POS software have not been modified to accommodate processing transactions to at least one of activate stored value accounts or load stored value accounts, wherein stored valued accounts are associated with stored value cards, and wherein a seller is provided with a plurality of stored value cards, and a customer conducting a transaction with the seller acquires a stored value card from the seller;
   parsing, by the processor, the first ISO/IEC 8583 compliant message to create a first parsed transaction request comprising a stored value account identifier associated with the stored value card, a first transaction amount, and a processing type code;
   determining, by the processor, that the processing type code is associated with a request to apply a credit to a stored value account associated with the stored value account identifier;
   determining, by the processor, that the stored value account identifier does not correspond to any stored value account identifier that is presently maintained by the charge authorization computer;
   inferring, by the processor and in response to the determining that the stored value account identifier does not correspond to any stored value account identifier that is presently maintained by the charge authorization computer, that the request to apply the credit is a request to create a new first stored value account;
   creating, by the processor, the new first stored value account;
   designating, by the processor, the new first stored value account as corresponding to the stored value card;
   crediting, by the processor, an amount to the new first stored value account;
   updating, by the processor, the status of the stored value card from inactive to pending active;
   receiving, by the processor and from a holder of the new first stored value account, information associated with the holder of the new first stored value account that cannot be transmitted to the charge authorization computer by way of the POS terminal; and activating, by the processor, the new first stored value account in response to receiving the information associated with the holder of the new first stored value account.

9. The method of claim 7, wherein the transaction account is issued to an end-user who is authorized to purchase goods or services from merchants that accept the account as payment.

10. A non-transitory, tangible computer readable storage medium having instructions stored thereon that, in response to execution by a charge authorization computer, cause the charge authorization computer to perform operations comprising:

receiving, by the charge authorization computer, a first ISO/IEC compliant message from a point-of-service (POS) terminal, wherein the POS terminal includes POS hardware and POS software, wherein the POS hardware and the POS software have not been modified to accommodate processing transactions to at least one of activate stored value accounts or load stored value accounts, wherein stored valued accounts are associated with stored value cards, and wherein a seller is provided with a plurality of stored value cards, and a customer conducting a transaction with the seller acquires a stored value card from the seller;

parsing, by the charge authorization computer, the first ISO/IEC 8583 compliant message to create a first parsed transaction request comprising a stored value account identifier associated with the stored value card, a first transaction amount, and a processing type code;

determining, by the charge authorization computer, that the processing type code is associated with a request to apply a credit to a stored value account associated with the stored value account identifier;

determining, by the charge authorization computer, that the stored value account identifier does not correspond to any stored value account identifier that is presently maintained by the charge authorization computer;

inferring, by the charge authorization computer and in response to the determining that the stored value account identifier does not correspond to any stored value account identifier that is presently maintained by the charge authorization computer, that the request to apply the credit is a request to create a new first stored value account;

creating, by the charge authorization computer, the new first stored value account;

designating, by the charge authorization computer, the new first stored value account as corresponding to the stored value card;

crediting, by the charge authorization computer, an amount to the new first stored value account;

updating, by the charge authorization computer, the status of the stored value card from inactive to pending active;

receiving, by the charge authorization computer and from a holder of the new first stored value account, information associated with the holder of the new first stored value account that cannot be transmitted to the charge authorization computer by way of the POS terminal;

activating, by the charge authorization computer, the new first stored value account in response to receiving the information associated with the holder of the new first stored value account.

11. The method of claim 9, further comprising:

determining, by the charge authorization computer, a first account limit associated with the first stored value account, the account limit at least partially based on the first transaction amount;

authorizing, by the charge authorization computer, merchants to receive additional funds from an end-user in order to increase the first account limit, wherein the merchants indicate the amount of the increase by transmitting a second ISO/IEC 8583 compliant message in a format selected from the group of ISO/IEC 8583 standard message formats consisting of: funding, credit, return and void formats;

receiving, by the charge authorization computer, a third ISO/IEC 8583 standard message from the POS terminal;

parsing, by the charge authorization computer, third ISO/IEC 8583 compliant message to create a second parsed transaction request, comprising second account identifier, a second transaction amount, and a second processing type code;

determining, by the charge authorization computer, that the second processing type code is associated with a request to apply a credit to a second transaction account associated with the second account identifier;

determining, by the charge authorization computer and based upon the second account identifier, that the second transaction account associated with the second ISO/IEC compliant message is an account associated with a second stored value card;

in response to the determining that the second transaction account is the second stored value account, inferring, by the charge authorization computer, that the request to apply a credit is a request to reload the second stored value account; and increasing, by the charge authorization computer, a second account limit associated with the second stored value account by an amount at least partially determined by the second transaction amount.

12. The system of claim 8, further comprising:

determining, by the processor, a first account limit associated with the first stored value account, the account limit at least partially based on the first transaction amount;

authorizing, by the processor, merchants to receive additional funds from an end-user in order to increase the first account limit, wherein the merchants indicate the amount of the increase by transmitting a second ISO/IEC 8583 compliant message in a format selected from the group of ISO/IEC 8583 standard message formats consisting of: funding, credit, return and void formats;

receiving, by the processor, the second ISO/IEC 8583 standard message from the POS terminal;

parsing, by the processor, a third ISO/IEC 8583 compliant message to create a second parsed transaction request, comprising second account identifier, a second transaction amount, and a second processing type code;

determining, by the processor, that the second processing type code is associated with a request to apply a credit to a second transaction account associated with the second account identifier;

determining, by the processor, based upon the second account identifier, that the second transaction account associated with the second ISO/IEC compliant message is an account associated with a second stored value card;

in response to the determining that the second transaction account is the second stored value account, infer that the request to apply a credit is a request to reload the second stored value account; and increasing, by the processor, a second account limit associated with the second stored value account by an amount at least partially determined by the second transaction amount.

13. The storage medium of claim 10, further comprising:

determining, by the charge authorization computer, a first account limit associated with the first stored value account, the account limit at least partially based on the first transaction amount;

authorizing, by the charge authorization computer, merchants to receive additional funds from an end-user in order to increase the first account limit, wherein the merchants indicate the amount of the increase by transmitting a second ISO/IEC 8583 compliant message in a format selected from the group of ISO/IEC 8583 standard message formats consisting of: funding, credit, return and void formats;

receiving, by the charge authorization computer, the second ISO/IEC 8583 standard message from the POS terminal;

parsing, by the charge authorization computer, a third ISO/IEC 8583 compliant message to create a second parsed transaction request, comprising second account identifier, a second transaction amount, and a second processing type code;

determining, by the charge authorization computer, that the second processing type code is associated with a request to apply a credit to a second transaction account associated with the second account identifier;

determining, by the charge authorization computer and based upon the second account identifier, that the second transaction account associated with the second ISO/IEC compliant message is an account associated with a second stored value card;

in response to the determining that the second transaction account is the second stored value account, inferring, by the charge authorization computer, that the request to apply a credit is a request to reload the second stored value account; and increasing, by the charge authorization computer, a second account limit associated with the second stored value account by an amount at least partially determined by the second transaction amount.

* * * * *